United States Patent [19]
Sogame

[11] Patent Number: 4,802,114
[45] Date of Patent: Jan. 31, 1989

[54] PROGRAMMABLE REMOTE CONTROL TRANSMITTER

[75] Inventor: Akira Sogame, Higashi-Osaka, Japan

[73] Assignee: General Electric Company, Schenectady, N.Y.

[21] Appl. No.: 941,468

[22] Filed: Dec. 15, 1986

[30] Foreign Application Priority Data

Feb. 7, 1986 [JP] Japan .................................. 61-24229

[51] Int. Cl.⁴ .......................... G06F 7/02; G08C 19/00
[52] U.S. Cl. .............................. 364/900; 340/825.72; 455/603
[58] Field of Search ... 364/200 MS File, 900 MS File; 340/825.57, 825.69, 825.72; 358/194.1; 455/603, 608

[56] References Cited

U.S. PATENT DOCUMENTS 4,482,947 11/1984 Zato et al. ...................... 455/603 X
4,623,887 11/1986 Welles, II ...................... 455/603 X
4,626,848 12/1986 Ehlers ............................. 455/603 X
4,703,359 10/1987 Rumbolt et al. ................ 455/603 X Primary Examiner—Thomas M. Heckler
Attorney, Agent, or Firm—Paul J. Rasmussen; Peter M. Emanuel; Thomas F. Lenihan

[57] ABSTRACT

A programmable remote control transmitter receives, in a learning mode, remote control codes for remote-controlling various devices and remote-controls the devices according to the received remote control codes by emulating their respective transmitters. The transmitter includes a first repetition pattern discriminator for compressing the remote control codes into first compressed data representing the pulse burst component and the pulse off component a second repetition pattern discriminator for converting pairs of the first compressed data into second compressed data, and a memory for storing the second compressed data. The transmitter also includes circuitry for use in a remote control mode of operation for reconverting the stored compressed data back into codes suitable for transmission to a particular device to be controlled.

10 Claims, 3 Drawing Sheets

| INPUT REMOTE CONTROL CODE ||  PRESET BIN CODE |
|---|---|---|
| THE NUMBER OF PULSES CONSTITUTING PULSE BURST PERIOD | PULSE OFF PERIOD | |
| 5 | | A |
| 3 | | B |
| | 100ms | C |
| | 50ms | D |

(NOTE) PULSE BURST FREQUENCY 40KHZ

FIG.3

| COMBINATION OF ADJACENT BIN CODES | PRESET BIN PAIR CODE |
|---|---|
| A B | I |
| C D | II |
| A C | III |

FIG.4

PROGRAMMABLE REMOTE CONTROL TRANSMITTER

BACKGROUND OF THE INVENTION

The present invention relates to a programmable remote control transmitter and, more particularly, to a programmable remote control transmitter for emulating any one of transmitters for remote-controlling electrical devices.

Various types of electronic products have been used at home to provide convenience in daily life in recent years. Most electric products have so-called remote controllers as transmitters for electrically remote-controlling the electric devices. Since every electric device employs a transmission system of a unique type, a transmitter for a given electric device cannot be used for another electric device. If the number of electric devices is increased, the number of types of transmitters is accordingly increased. When a large number of remote controllable electric devices are installed in a house, the user is often confused of selecting a transmitter appropriate for each electric device.

In order to solve this problem, the present applicant has proposed a programmable remote control transmitter. This programmable remote control transmitter receives various remote control codes from all transmitters used in the house and decodes these codes. The decoded remote control codes are stored in a memory. Where the remote control transmitter is used, a type of the electric device to be available is selected and the selected electric device is remotely controlled in accordance with the data stored in the memory which correspond to the remote control codes of the selected electric device. In the learning process, the programmable remote control transmitter receives signals from another transmitter for, e.g., a television receiver, and decodes the signals to obtain data. The data are then stored in a nonvolatile memory. When data are stored in the nonvolatile memory, data compression is performed to reduce a required memory capacity. In order to compress data, pulse burst and pulse off components which constitute data sent from the transmitter for the television receiver are classified into bins to learn the data. Data compression is then performed according to bin data obtained by learning. Each bin comprises 2-byte data. If a bin is "A", it represents the pulse burst component. If a bin is "B", it represents the pulse off component. The pulse burst and pulse off components are classified according to one or more bins. Various combinations of bins are proposed according to various transmission systems, and the number of bins is changed for each different system. A threshold value is predetermined to discriminate the pulse burst and pulse off components so as to classify pulse burst and pulse off components falling within the nominal range into a given or another bin. One such conventional programmable remote control transmitter is described in detail in Japanese Patent Prepublication No. 60-254898, corresponding to U.S. Pat. No. 4,623,887 (Welles II) issued Nov. 18, 1986.

In this transmitter, since data is compressed on the basis of repetition of unit data to be discriminated, data compression is limited by the length of unit data. Compactness required as a remote control transmitter and remote control performance are limited. If the number of control signals to be operated by the remote control transmitter is increased, a memory capacity and hence the number of peripheral circuits are increased. As a result, the total power consumption of the transmitter is increased, thus requiring a large-capacity battery or frequent replacement of batteries. In order to improve control performance of the remote control transmitter, the transmitter housing becomes bulky or the battery must be frequently replaced with a new one, resulting in cumbersome operation.

SUMMARY OF THE INVENTION

It is, therefore, a principal object of the present invention to provide a programmable remote control transmitter capable of making the electric device compact and maintaining high remote control performance.

In order to achieve the above object of the present invention, the present inventor examined a data pattern of compressed data of data received from different transmitters in a conventional remote control transmitter, and found that similar patterns were repeated. The present inventor performed second compression in units of a pair of data signals obtained by the first compression step.

With the above processing, data stored directly in the memory in the conventional remote control transmitter is compressed again before storage. The number of data signals to be stored in the memory is therefore decreased, compared with the conventional arrangement. Therefore, compactness and high remote control performance which have been presented as problems of the conventional remote control transmitters can be realized.

According to an aspect of the present invention, there is provided a programmable remote control transmitter for receiving in a learning mode remote control codes for remote-controlling various electric devices and for remote-controlling the electric devices according to the received remote control codes, comprising a detector for receiving in the learning mode remote control codes from a given transmitter to be emulated for an electric device to be controlled, the remote control codes including a pulse burst component and a pulse off component, a first repetition pattern discriminator for receiving electrical pulses of the remote control codes detected by the detector and for compressing the remote control codes into first compressed data consisting of given types of codes representing the pulse burst component and the pulse off component following the pulse burst component, a second repetition pattern discriminator for receiving the first compressed data from the first repetition pattern discriminator and for converting combinations each of which consists of two adjacent codes constituting the first compressed data into second compressed data consisting of codes of a type different from the given types, a memory for storing the second compressed data from the second repetition pattern discriminator, a third repetition pattern discriminator for receiving the or each second compression data from the memory to control a selected electric device in the remote control mode and converting the or each second compression data into a corresponding combination of two adjacent codes constituting the first compression data, a fourth repetition pattern discriminator for receiving the combinations each of which consists of two adjacent codes constituting the first compressed data sent from the third repetition pattern discriminator and for converting the combination of adjacent codes into the electrical pulses of the remote control codes corresponding to the electric device to be controlled, and a signal output device for receiving the electric pulses and sending a control signal to the electric device to be controlled.

BRIEF DESCRIPTION OF THE DRAWINGS

FIG. 3 is a table showing conversion codes of reference bin pattern setting circuits respectively built into first and fourth repetition pattern discriminators in FIG. 1; and FIG. 4 is a table showing conversion codes of reference bin pair pattern setting circuits respectively built into second and third repetition pattern discriminators in FIG. 1.

DESCRIPTION OF THE PREFERRED EMBODIMENT

Figure 1:
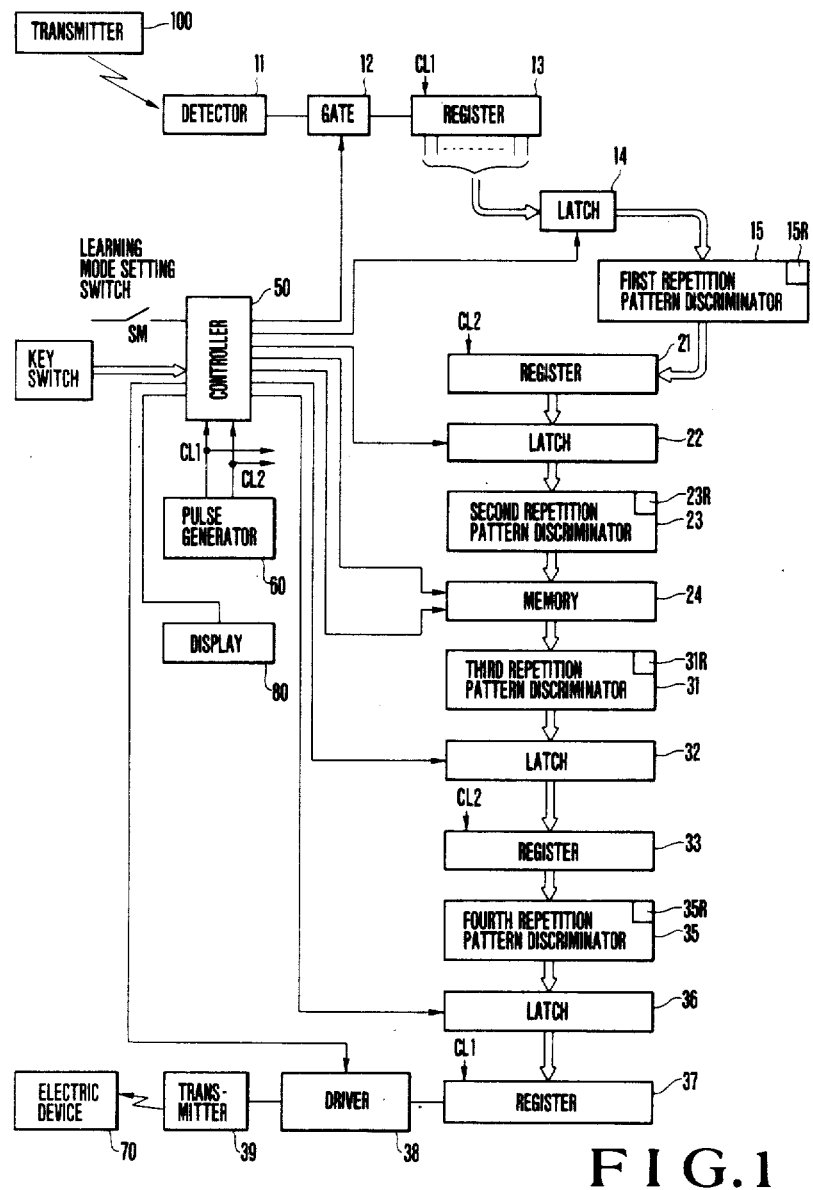
FIG. 1 is a block diagram of a programmable remote control transmitter according to an embodiment of the present invention.

FIG. 1 shows the basic arrangement of a programmable remote control transmitter according to an embodiment of the present invention. Referring to FIG. 1, the transmitter comprises a detector 11 for receiving in a learning mode an infrared or ultrasonic remote control code from a transmitter 100 of an electric device. The detector 11 also has a waveshaping function. The remote control code sent from the transmitter 100 of the electric device has variable pulse burst and variable pulse off periods, as shown in FIG. 2A. An output from the detector 11 is supplied to a register 13 through a gate 12. The register 13 also sequentially receives outputs from the detector 11 in response to one (i.e., a clock CL1) of the clocks sent from a pulse generator 60. Each output from the detector 11 is classified into a pulse burst period and the subsequent pulse off period. Parallel outputs from the register 13 are supplied to a first repetition pattern discriminator 15 through a latch 14. The first repetition pattern discriminator 15 discriminates which predetermined bin pattern corresponds to the pulse burst or pulse off pattern represented by the output from the register 13 and performs first data compression. The first repetition pattern discriminator 15 measures the pulse off period and the number of pulses during the pulse burst period. The resultant count and the off period are compared with preset bin patterns stored in a reference bin pattern setting circuit 15R built into the first repetition pattern discriminator 15. If a coincidence between the input data and the stored pattern is detected, a bin code corresponding to the bin pattern is sent out from the first repetition pattern discriminator 15. Comparison may be performed in units of input remote control codes or for all input remote control codes at once. The bin code from the first repetition pattern discriminator 15 is supplied to a register 21. The register 21 receives the bin code in response to one (i.e., a clock CL2) of the clocks from the pulse generator 60. A parallel signal is output from the register 21. The parallel signal is supplied to a second repetition pattern discriminator 23 through a latch 22.

The second repetition pattern discriminator 23 operates in a different manner from the first repetition pattern discriminator 15. More specifically, the second repetition pattern discriminator 23 compares a pair of adjacent ones of the bin codes obtained by the first repetition pattern discriminator 15 with a reference bin pair code pattern prestored in a reference bin pair pattern setting circuit 23R incorporated therein. Comparison may be performed in units of bin pair codes or for all bin pair codes at once. Data obtained by second data compression in this manner are stored in a predetermined area in a memory 24.

The learning process described above is repeated in units of command or operation keys arranged in the transmitter for each electric device, and compressed data corresponding to control data sent from each key are sequentially stored in the memory 24.

The above operation is performed for several electric devices, and data required for remote-controlling them are stored in the memory 24.

The data stored in the memory 24, as described above, are read out by the following circuit arrangement in the normal operation mode, i.e., the remote control mode.

In the remote control mode, the control mode corresponding to the electric device to be remote-controlled by the operator is selected, and an operation key (not shown) is operated. The controller 50 accesses the memory 24 in response to the key data from the operated key, and the compressed data is read out from a memory area at the designated address. The readout data is supplied to a third repetition pattern discriminator 31. The third repetition pattern discriminator 31 performs the operation opposite to that of the second repetition pattern discriminator 23, i.e., converts the bin pair code to the bin code. The input bin pair code is compared with a reference bin pair code pattern prestored in a reference bin pair pattern setting circuit 31R and is converted into a corresponding bin code. The converted bin code is supplied to a register 33 through a latch 32 and stored therein. The register 33 receives the bin code in response to the clock CL2 sent from the pulse generator 60. The content of the register 33 is sent to a fourth repetition pattern discriminator 35. The fourth repetition pattern discriminator 35 converts the bin code into an electrical signal of a remote control code consisting of pulse burst and pulse off components, in a manner opposite to that of the first repetition pattern discriminator 15. The input bin code is compared with a reference bin code pattern prestored in a reference bin pattern setting circuit 35R built into the fourth repetition pattern discriminator 35 and is converted to a corresponding remote control code. The remote control code is stored in a register 37 through a latch 36. The register 37 sequentially supplies remote control codes to an LED driver 38 in response to the clocks CL1 from the pulse generator 60. An infrared or ultrasonic remote control code signal is sent to the electric device 70 through a transmitter 39 to control the electric device 70.

Referring to FIG. 1, reference numeral 80 denotes a display for displaying functions, modes and commands for operating the remote control transmitter. Reference symbol SM denotes a switch for setting a learning mode. The switch SM is manually operated. The controller 50 generates various control signals at predetermined timings in response to clock pulses supplied from the pulse generator 80 so as to control the operation of the gate 12, the latches 14, 22, 32, and 36, and the memory 24. The control signals can be generated by techniques known to those skilled in the art, and a detailed description thereof will be omitted.

Figure 2:
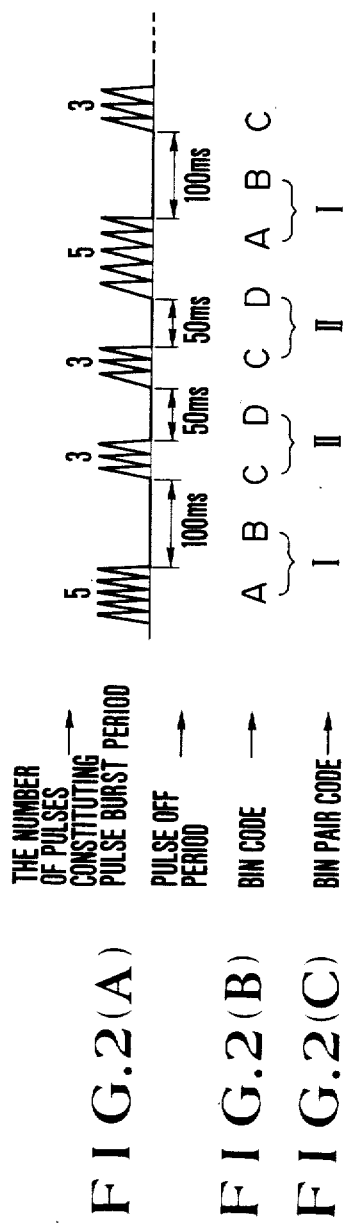
FIGS. 2A to 2C are schematic charts for explaining the programmable remote control transmitter in FIG. 1.

With the above arrangement, the operations of the first to fourth repetition pattern discriminators 15, 23, 31, and 35 as the main feature of the present invention will be described with reference to FIGS. 2 to 4.

In the learning mode, the remote control code signal in FIG. 2A is supplied as an operation key signal from the transmitter 100 for the electric device. Numeric values written on the pulses of the burst periods represent the numbers of pulses constituting the pulse burst periods. The times written below the signal represent pulse off periods. Therefore, there are two types of pulse burst components respectively having five and three pulses, and two types of pulse off periods as 100 ms and 50 ms.

The remote control signal is waveshaped by the detector 11. The waveshaped signal is supplied to the first repetition pattern discriminator 15 through the register 13. The first repetition pattern discriminator 15 compares the input electrical signal with the reference bin patterns stored in a reference bin pattern setting circuit 15R. The conversion codes shown in FIG. 3 are stored in the reference bin pattern setting circuit 15R. When the electrical signal in FIG. 2A is supplied to the first repetition pattern discriminator 15, it converts the pulse burst "5" into a bin code "A". The pulse off period "100 ms" following the pulse burst "5" is converted into a bin code "C". The pulse burst "3" following the pulse off period "100 ms" is converted into a bin code "B". The pulse off period "50 ms" following the pulse burst "3" is converted into a bin code "D". The electrical signals are sequentially converted to bin codes in the same manner as described above. The array of bin codes is shown below the corresponding signal components in FIG. 2B.

The bin code array is supplied to the second repetition pattern discriminator 23 through the register 21 and the latch 22. The bin code array is compared with the reference bin pair patterns stored in the reference bin pair pattern setting circuit 23R. The conversion codes in FIG. 4 are stored in the reference bin pair pattern setting circuit 23R. The second repetition pattern discriminator 23 discriminates coincidences between the bin pair codes shown in FIG. 4 and the combinations each consisting of two adjacent bin codes. The first combination "AB" of two adjacent bin codes corresponds to a bin pair code "I" and is converted thereinto. The second combination "CD" of two adjacent bin codes corresponds to a bin pair code "II" and is converted thereinto. The third combination "CD" of two adjacent bin codes corresponds to the bin pair code "II" and is converted thereinto. The subsequent combinations each consisting of two adjacent bin codes are converted into the corresponding reference bin pair codes. An array of resultant bin pair codes is shown in FIG. 2C below the corresponding bin codes in FIG. 2B. The bin pair codes are stored as compressed data in the memory 24.

The third repetition pattern discriminator 31 converts the bin pair code to a combination of two adjacent bin codes in a manner opposite to that of the second repetition pattern discriminator 23. Each compressed data, i.e., each bin pair code, read out from the memory 24 is converted into the corresponding combination of two adjacent bin codes according to the conversion codes (FIG. 4) stored in the reference bin pair pattern setting circuit 31R built into the third repetition pattern discriminator 31. For example, if the bin pair code is "III", the combination "AC" of two adjacent bin codes is obtained as a conversion output. Similarly, if the bin pair code is "II", the combination "CD" of two adjacent bin codes is obtained as a conversion output. If the bin pair code is "I", the combination "AB" of two adjacent bin codes is obtained as a conversion output. The resultant combinations each consisting of two adjacent bin codes are supplied to the register 33 through the latch 32 and stored therein.

The fourth repetition pattern discriminator 35 converts each combination of two adjacent bin codes into remote control codes in a manner opposite to the first repetition pattern discriminator 15. An array of the bin code combinations read out from the register 33 is converted to a remote control code electrical signal according to the conversion codes (FIG. 3) stored in the reference pattern setting circuit 35R built into the fourth repetition pattern discriminator 35. For example, a pulse signal constituting the pulse burst "5" is obtained as a conversion output for the bin code "A". Similarly, a pulse off period "100 ms" is obtained as a conversion output for the bin code "C". A pulse signal constituting the pulse burst "3" is obtained as a conversion output for the bin code "B". A pulse off period "50 ms" is obtained as a conversion output for the bin code "D".

The array of the remote control codes is sent to the register 37 through the latch 36.

The formats of the remote control codes are not limited to the ones used in the above description. Other various code formats may be utilized. For example, a code format may be a pulse coded format, a continuous wave format, a format consisting of a combination of a single pulse and a variable gap.

In the above embodiment, the operation is performed by hardware. However, the same operation as described above may be performed by a combination of a computer and software, and more particularly a combination of a central processing unit (CPU) and a program memory for storing permanent programs for executing the above operation in cooperation with the CPU. In this case, the registers and latches in the above embodiment may be constituted by a dynamic memory such as a RAM incorporated in the CPU. However, other memories may also be used. The controller corresponds to the CPU and the program memory. The pattern discriminators correspond to part of the program memory which allocates conversion tables. If the combination of the computer and software is used, the reference bin pattern setting circuits incorporated in the first and fourth repetition pattern discriminators 15 and 35 can be constituted by a single circuit. The same is true for the reference bin pair pattern setting circuits incorporated in the second and third repetition pattern discriminators 23 and 31.

In the above embodiment, the bin code is converted to a corresponding bin pair code once. However, the bin code may be converted a plurality of times.

As described above in detail, when the programmable remote control transmitter according to the present invention is used, data stored directly in the memory in the conventional remote control transmitter is compressed again. Therefore, a small-capacity memory can be used. Compactness and high remote control performance, both of which cannot be attained by the conventional programmable remote control transmitters, can be achieved according to the present invention. According to the test results, the memory capacity could be reduced into half in the transmitter of the present invention, compared with the conventional transmitter described in U.S. Pat. No. 4,623,887 (Welles II).

What is claimed is:

1. A programmable remote control transmitter having learning mode of operation for receiving remote control signals used for remote-controlling various electrical devices and having a remote control mode of operation for remote-controlling said electric devices according to the received remote control signals, comprising:

a detector for receiving, when said transmitter is in said learning mode of operation, said remote control signals from a given transmitter to be emulated, said remote control signals including a pulse burst component and a pulse off component;

a first repetition pattern discriminator for receiving electrical pulses corresponding to said remote control signals detected by said remote control signals into first compressed data comprising a first plurality of pulse burst codes and a second plurality of pulse off codes, wherein each pulse burst code defines a type of said pulse burst component and each pulse off code defines a type of said pulse off component and wherein a code pair comprises a pulse burst code and the pulse off code generated immediately thereafter;

a second repetition pattern discriminator for receiving said first compressed data from said first repetition pattern discriminator and further compressing said first compressed data to form second compressed data by examining said code pairs of said first compressed data for corresponding to predetermined patterns and converting said code pairs corresponding to said predetermined patterns to a third plurality of codes different from said first and second pluralities of codes, wherein a single code of said third plurality of codes represents said code pair of said second plurality of codes;

a memory for storing the second compressed data received from said second repetition pattern discriminator;

a third repetition pattern discriminator for receiving when said transmitter is in said remote control mode of operation said second compressed data from said memory to control a selected electric device and converting said second compressed data into a corresponding code pair constituting said first compressed data;

a fourth repetition pattern discriminator for receiving said first compressed data from said third repetition pattern discriminator and for converting said first compressed data into said electrical pulses of said remote control signals corresponding to said electric device to be controlled; and a signal output device for receiving said electric pulses and transmitting a control signal to the electric device to be controlled.

2. A transmitter according to claim 1, wherein said first to fourth repetition pattern discriminators are constituted by a microcomputer including a central processing unit and a memory for storing a processing sequence of said central processing unit.

3. A transmitter according to claim 1, wherein said first and fourth repetition pattern discriminators comprise a common reference pattern memory.

4. A transmitter according to claim 3, wherein said first compressed data comprise bin codes.

5. A transmitter according to claim 3, wherein said second and third pattern discriminators comprise a memory setting circuit for storing a common reference adjacent code pattern.

6. A transmitter according to claim 1, wherein said second compressed data comprise bin pair codes.

7. A transmitter according to claim 1, wherein said first compressed data comprise bin codes.

8. A transmitter according to claim 7, wherein the second compressed data comprise bin pair codes.

9. A remote control transmitter for controlling various devices each of which may utilize a different one of a plurality of control code transmission formats, comprising:

keyboard means for entering control data for controlling one of said devices;

memory means for storing twice compressed data comprising bin pair codes, wherein each of said bin pair codes is a single code corresponding to a pair of bin codes, said pair of bin codes comprising a first code representing a type of pulse burst component of a remote control signal and a second code representing a type of pulse off component of said remove control signal, said signal having a given one of said transmission formats;

addressing means for addressing an area of said memory means containing said twice compressed data which corresponds to said one of said plurality of control code transmission formats utilized by said devices to be controlled;

means for expanding said twice compressed data to once compressed data by converting said bin pair codes to pairs of bin codes;

means for expanding said once compressed data by converting said bin codes to fully expanded data representative of pulse burst and pulse off components of said one of said control code transmission formats; and transmitting means for receiving said fully expanded data and for transmitting said data in said one of said plurality of transmission formats for controlling said devices to be controlled.

10. Apparatus for programming a memory for a remote control transmitter with control codes received from various other remote control transmitters which may utilize different ones of a plurality of control code transmission formats, comprising:

data entry means for entering an indication of a control code to be received;

detector means for receiving signals having a pulse burst component and a pulse off component from one of said transmitters and converting said signals to data representative of said signals;

control means for receiving said data from said detector means and for compressing said data by examining said data, classifying said data by type of pulse burst and pulse off components, and by converting said classified data to bin codes representative of said pulse burst type and pulse off type;

said control means further compressing said data by examining pairs of said bin codes for correspondence to a predetermined pattern and converting bin code pairs having said correspondence to twice compressed data having a code indicative of said bin code pair; and wherein said control means programs said memory means with said twice compressed data.

* * * * *